US012654386B2

(12) United States Patent
Kim et al.

(10) Patent No.: US 12,654,386 B2
(45) Date of Patent: Jun. 16, 2026

(54) POUCH CURL PREVENTION APPARATUS

(71) Applicant: LG Energy Solution, Ltd., Seoul (KR)

(72) Inventors: Gee Hwan Kim, Daejeon (KR); Ho Young Park, Daejeon (KR); Woong Gun Oh, Daejeon (KR); Su Ho Jeon, Daejeon (KR); Sang Uk Yeo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 459 days.

(21) Appl. No.: 18/017,783

(22) PCT Filed: Jul. 8, 2022

(86) PCT No.: PCT/KR2022/009902
§ 371 (c)(1),
(2) Date: Jan. 24, 2023

(87) PCT Pub. No.: WO2023/282681
PCT Pub. Date: Jan. 12, 2023

(65) Prior Publication Data
US 2023/0286205 A1      Sep. 14, 2023

(30) Foreign Application Priority Data
Jul. 8, 2021      (KR) ........................ 10-2021-0089816

(51) Int. Cl.
*B29C 51/26*          (2006.01)
*B29C 51/08*          (2006.01)
(Continued)

(52) U.S. Cl.
CPC ............ *B29C 51/261* (2013.01); *B29C 51/08* (2013.01); *B29C 51/14* (2013.01); *B29L 2031/3468* (2013.01); *H01M 50/105* (2021.01)

(58) Field of Classification Search
CPC ....... B29C 51/04; B29C 51/08; B29C 51/082; B29C 51/14; B29C 51/261; B29C 51/262; B29C 51/265; H01M 50/105
See application file for complete search history.

(56) References Cited

U.S. PATENT DOCUMENTS 5,632,133 A      5/1997  Wyslotsky
10,777,779 B2 *  9/2020  Kim ........................ B32B 38/00
(Continued)

FOREIGN PATENT DOCUMENTS

CN          203331107 U      12/2013
CN          208944968 U      6/2019
(Continued)

OTHER PUBLICATIONS

1 International Search Report for PCT/KR2022/009902 mailed Oct. 24, 2022. 3 pgs.
(Continued)

*Primary Examiner* — Seyed Masoud Malekzadeh
(74) *Attorney, Agent, or Firm* — Lerner David LLP

(57) ABSTRACT

The present invention relates to a pouch curl prevention apparatus used in a pouch forming process, more particularly to a pouch curl prevention apparatus located at the rear of a pouch film forming apparatus. The pouch curl prevention apparatus includes an upper roller assembly including an upper roller unit having an upper roller and a lower roller assembly including a lower roller unit having a lower roller. The upper roller and the lower roller are located so as to face each other, and at least one of the upper roller and the lower roller is rotatable. The upper roller unit and the lower roller unit being arranged to receive a pouch film supplied from the pouch film forming apparatus therebetween.

8 Claims, 3 Drawing Sheets

(51) Int. Cl.
B29C 51/14 (2006.01)
B29L 31/34 (2006.01)
H01M 50/105 (2021.01)

(56) References Cited

U.S. PATENT DOCUMENTS

2004/0231287 A1* 11/2004 Redmond ............... B65B 61/18
53/551
2010/0326160 A1* 12/2010 Runyan .................. B21D 5/083
72/181
2019/0207172 A1 7/2019 Kim et al.

FOREIGN PATENT DOCUMENTS

| | | | |
|---|---|---|---|
| CN | 210723262 U | 6/2020 |
| CN | 112952241 A | 6/2021 |
| JP | 2000288664 A | 10/2000 |
| JP | 2008226502 A | 9/2008 |
| JP | 2015030167 A | 2/2015 |
| JP | 2018024059 A | 2/2018 |

| | | | | |
|---|---|---|---|---|
| KR | 20170114416 A | 10/2017 | |
| KR | 20180032043 A | 3/2018 | |
| KR | 20180092174 A | 8/2018 | |
| KR | 20180106523 A | 10/2018 | |
| KR | 20180134133 A | 12/2018 | |
| KR | 101958882 B1 | 3/2019 | |
| KR | 20190038094 A | 4/2019 | |
| KR | 20190098581 A | 8/2019 | |
| KR | 102150010 B1 | 8/2020 | |
| KR | 102224911 B1 | 3/2021 | |
| KR | 102230937 B1 | 3/2021 | |
| KR | 20210038333 A | 4/2021 | |
| WO | WO-2018174423 A1 * | 9/2018 | ......... B32B 38/0012 |

OTHER PUBLICATIONS

Extended European Search Report including Written Opinion for Application No. 22838033.3 dated Feb. 27, 2024, pp. 1-7.
Search Report dated Mar. 24, 2026 from the Office Action for Chinese Application No. 202280005516.8 issued Mar. 26, 2026, 2 pages.

* cited by examiner

【FIG. 1】
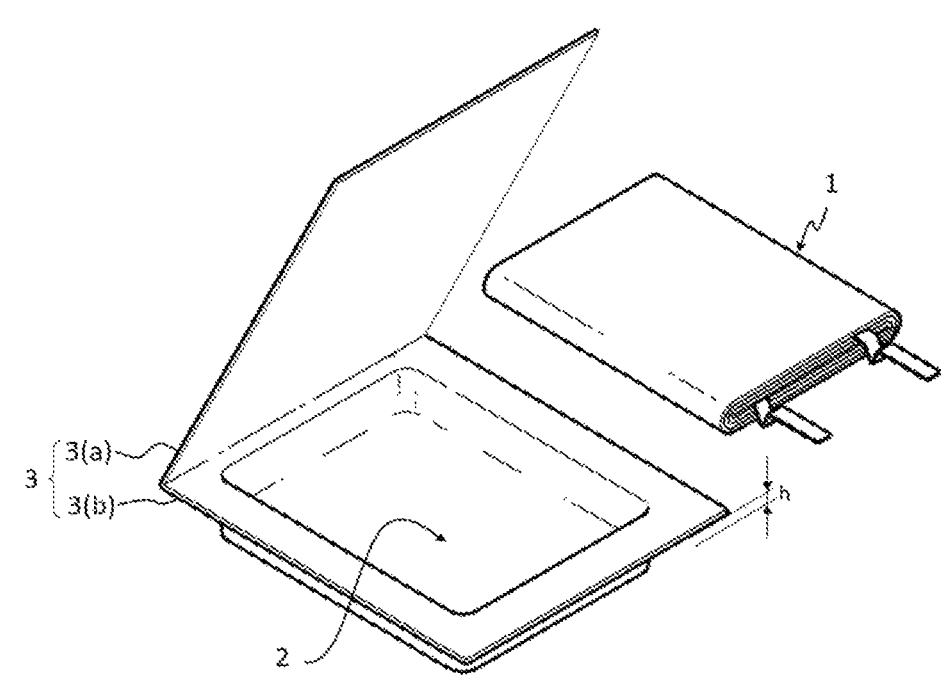
PRIOR ART
【FIG. 2】
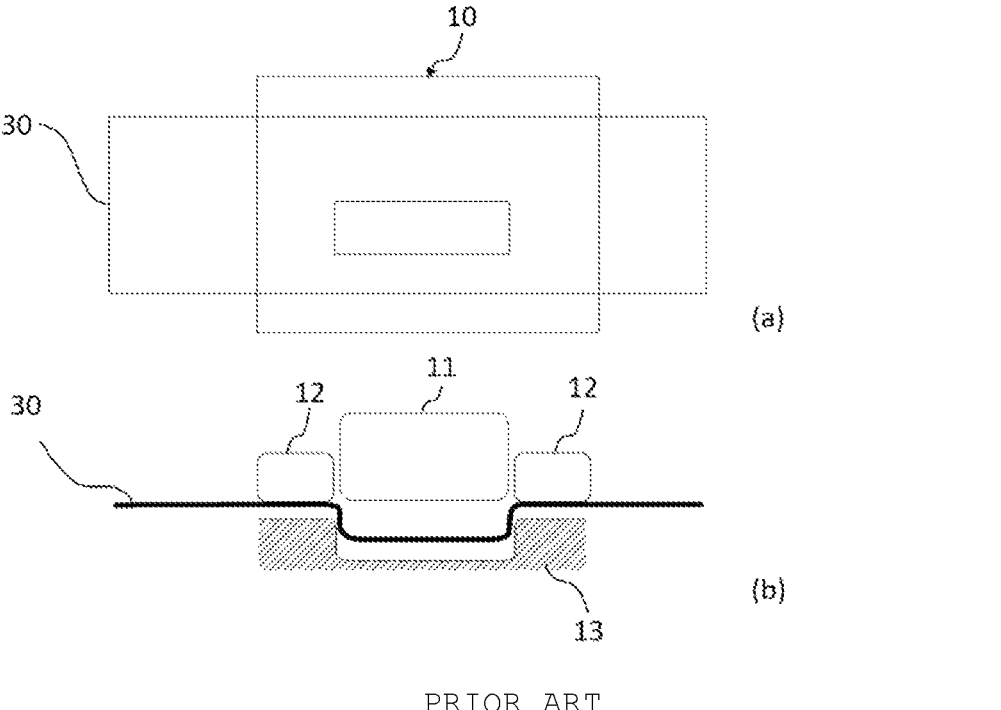
(a)
(b)
PRIOR ART

【FIG. 3】
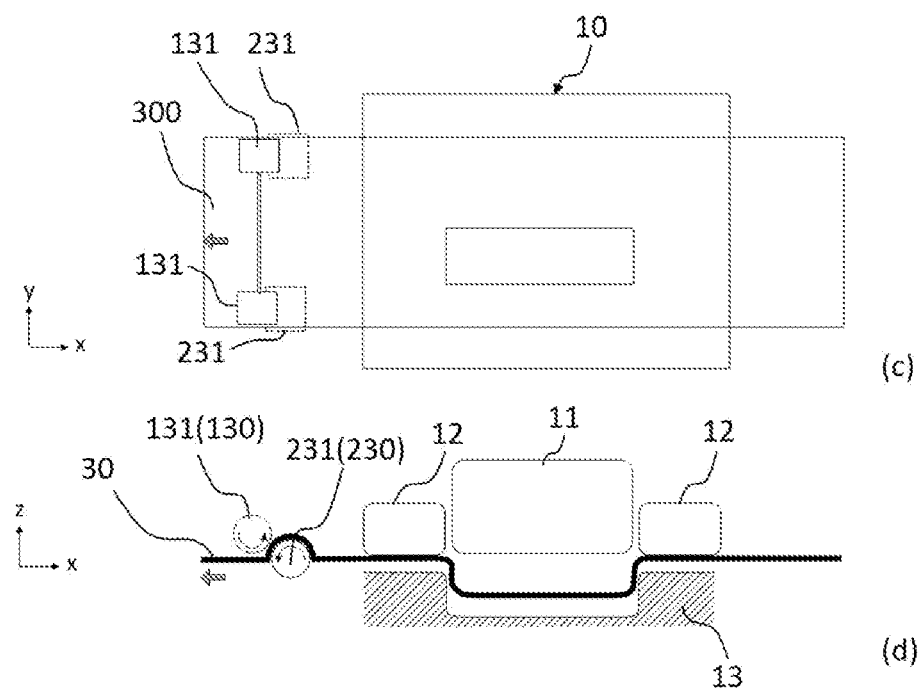
(c)
(d)
【FIG. 4】
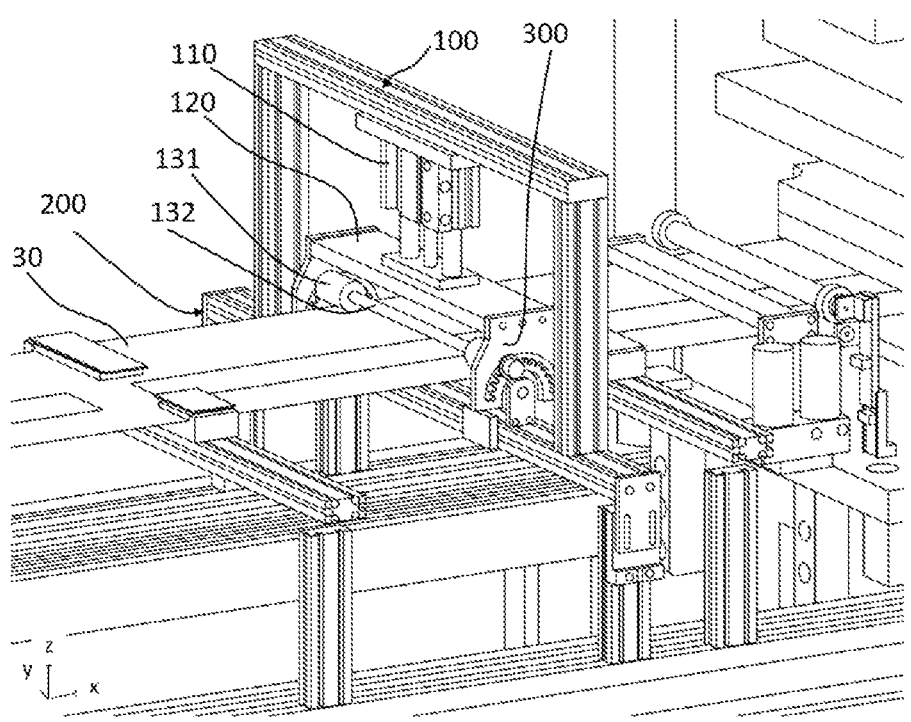

【FIG. 5】
【FIG. 6】
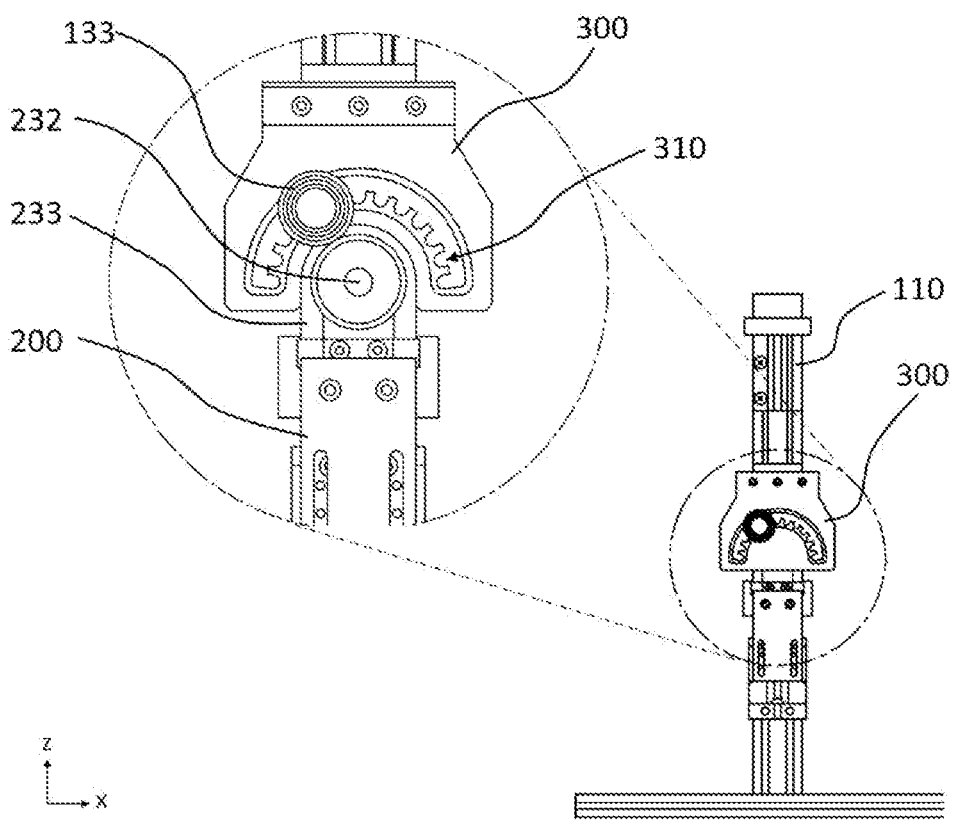

POUCH CURL PREVENTION APPARATUS

CROSS REFERENCE TO RELATED APPLICATIONS

This application is a national phase entry under 35 U.S.C. § 371 of International Application No. PCT/KR2022/009902 filed on Jul. 8, 2022, which claims the benefit of priority to Korean Patent Application No. 10-2021-0089816 filed on Jul. 8, 2021, the disclosures of which are incorporated herein by reference in their entireties.

TECHNICAL FIELD

The present invention relates to a pouch curl prevention apparatus capable of applying stress to curls formed at an edge of a cup portion by pressing of a punch in a pouch forming process, which is recognized as an important problem in the present invention, in an opposite direction to alleviate the formed curls and being easily applicable to a conventional pouch forming process.

BACKGROUND ART

With increasing demand for portable electronic devices, such as a smartphone, a tablet, and a laptop computer, demand for secondary batteries as energy sources thereof has also abruptly increased. Thereamong, a lithium secondary battery, which has high energy density and a long battery lifespan, has been most widely used.

The lithium secondary battery includes an electrode assembly, configured such that a positive electrode sheet having a positive electrode active material applied thereto and a negative electrode sheet having a negative electrode active material applied thereto are disposed in the state in which a separator is interposed therebetween, and a battery case configured to receive the electrode assembly together with an electrolytic solution in a sealed state. Depending on the shape of a sheathing member, the lithium secondary battery may generally be classified as a can-shaped secondary battery having an electrode assembly mounted in a metal can or a pouch-shaped secondary battery having an electrode assembly mounted in a pouch made of an aluminum laminate sheet.

In a process of manufacturing the pouch-shaped secondary battery, in order to reduce a dead space in a battery cell while stably mounting and fixing the electrode assembly, which has a predetermined volume, in the battery case, a process of forming an electrode assembly receiving portion in the laminate sheet is generally performed using a deep drawing apparatus.

FIG. 1 is an exploded perspective view schematically showing the construction of a general pouch-shaped secondary battery.

Referring to FIG. 1, the pouch-shaped secondary battery, which is a single cup type pouch-shaped secondary battery, includes a pouch case 3 made of an aluminum laminate sheet and a cell assembly 1 received in the pouch case 3, the cell assembly being configured such that a plurality of electrochemical cells, each of which includes a positive electrode, a separator, and a negative electrode, is stacked. As shown in FIG. 1, the pouch case 3 is a single cup type pouch case configured such that connection is achieved at one edge thereof. The pouch case 3 includes an upper pouch film 3(*a*) and a lower pouch film 3(*b*). A cup portion 2 configured to allow the cell assembly 1 to be seated therein is formed in the lower pouch film 3(*b*). The cup portion 2, which has a shape corresponding to the shape of the cell assembly 1, is formed in the lower pouch film 3(*b*) through a forming process, wherein the depth h of the cup portion is set depending on the thickness of the cell assembly 1.

FIG. 2 is a process view showing a forming process in which a pouch film forming apparatus 10 forms a receiving portion in a pouch film 30. (a) of FIG. 2 is a forming process plan view, and (b) of FIG. 2 is a forming process side view.

Referring to FIG. 2, the pouch film forming apparatus 10 includes a punch 11, a stripper 12, and a die 13. The die 13 is provided with a seating recess (not shown) having a shape corresponding to the shape of a desired pouch case when the pouch case is formed using the pouch film 30. At this time, the depth of the seating recess corresponds to the depth of a receiving portion to be formed in the desired pouch case. In order to form a pouch case having a receiving portion of a desired depth using the pouch film 30, the punch 11 applies pressure to the pouch film 30 disposed on the die 13. That is, the punch presses the pouch film to form the pouch case.

During such a forming process, curls are generated at the pouch film, and defects occur due to curls in cutting and sealing processes after the pouch case forming process, whereby quality of a secondary battery is deteriorated.

Patent Document 1, which relates to a process of forming an electrode assembly receiving portion using a deep drawing apparatus capable of adjusting the tensile force of a laminate sheet, discloses technology in which a roller unit is located at an upper surface adjacent to an edge of a cup portion of a pouch in a forming process, the roller unit moves the laminate sheet, a second gripper side is pressed, whereby tensile force applied to the laminate sheet is reduced, and therefore wrinkles are prevented when the laminate sheet is pressed by a punch.

Patent Document 2 discloses technology in which, in order to prevent generation of curls through rolling of a plurality of rollers in a cutting process to cut a part of an edge of a pouch after forming, a plurality of upper roller and lower roller pairs capable of rolling in contact with upper and lower surfaces adjacent to opposite edges of a pouch-shaped secondary battery is provided, a support frame configured to support a roller assembly is provided, the upper and lower rollers are located so as to correspond to each other, and a rolling operation is performed with respect to the upper and lower surfaces adjacent to the opposite edges of the pouch-shaped secondary battery, whereby stress is removed, thus preventing generation of curls.

However, a pouch curl prevention apparatus capable of applying stress to curls formed at an edge of a cup portion by pressing of a punch in a pouch forming process, which is recognized as an important problem in the present invention, in an opposite direction to alleviate the formed curls and being easily applicable to a conventional pouch forming process has not yet been proposed.

PRIOR ART DOCUMENTS

Korean Registered Patent Publication No. 10-2150010 ("Patent Document 1")
Korean Registered Patent Publication No. 10-2224911 ("Patent Document 2")

DISCLOSURE

Technical Problem

The present invention has been made in view of the above problems, and it is an object of the present invention to provide a pouch curl prevention apparatus capable of applying stress to curls formed at an edge of a pouch in a pouch film forming process in an opposite direction to alleviate or remove the curls and being easily applicable to a conventional pouch film forming process.

Technical Solution

A pouch curl prevention apparatus according to the present invention to accomplish the above object is located at the rear of a pouch film forming apparatus and includes an upper roller assembly (100) including an upper roller (131) and a lower roller assembly (200) including a lower roller (231), wherein the upper roller (131) and the lower roller (231) are located so as to face each other, at least one of the upper roller (131) and the lower roller (231) is rotatable, and a pouch film supplied from the pouch film forming apparatus passes between an upper roller unit (130) and a lower roller unit (230).

The upper roller (131) and the lower roller (231) may be located so as to face each other in a state of being spaced apart from each other by a predetermined distance, and a pouch edge of the pouch film supplied from the pouch film forming apparatus may pass between the upper roller (131) and the lower roller (231).

The upper roller assembly (100) may include a pair of upper rollers (131) located spaced apart from each other by a predetermined distance, the lower roller assembly (200) may include a pair of lower rollers (231) located spaced apart from each other by a predetermined distance, and the pair of upper rollers (131) and the pair of lower rollers (231) may be located so as to face each other in a state of corresponding to each other.

The upper roller assembly (100) may include a position change portion (300) of the upper roller.

The position change portion (300) may include a plurality of recessed portions (310) configured to allow an upper roller shaft (132) of the upper roller unit (130) to be mounted therein.

The position of the recessed portion (310) in which the upper roller shaft (132) is mounted may be changed to adjust the distance between the upper roller (131) and the lower roller (231).

The distance between the pair of upper rollers (131) or the distance between the pair of lower rollers (231) may be adjustable.

The upper roller assembly (100) may include a vertical support portion (110) configured to be movable upwards and downwards in order to adjust the height of the upper roller unit (130).

The lower roller assembly (200) may include a lower roller fixing portion (233), and the lower roller fixing portion (233) may be provided with a position adjustment member configured to adjust the up and down position of the lower roller.

At least one of the upper roller (131) and the lower roller (231) located so as to face each other may be made of an elastic material.

In addition, the present invention may provide possible combinations of the above solving means.

Advantageous Effects

As is apparent from the above description, it is possible to apply stress curls generated at an edge of a pouch cup portion formed in a pouch film forming process according to the present invention in an opposite direction, whereby it is possible to alleviate or remove the generated curls.

A pouch curl prevention apparatus according to the present invention is applied to produce pouch cases with improved quality, whereby it is possible to reduce a defect rate in a subsequent process and to manufacture a high-quality pouch-shaped secondary battery.

The pouch curl prevention apparatus according to the present invention is easily applicable to a conventional pouch film forming process, whereby it is possible to improve economic efficiency in the pouch film forming process.

DESCRIPTION OF DRAWINGS

FIG. 1 is a schematic view showing the construction of a general pouch-shaped secondary battery.

FIG. 2 is a process view showing a forming process in which a pouch film forming apparatus forms a cup portion in a pouch film.

FIG. 3 is a process view showing a pouch film forming process using a pouch curl prevention apparatus according to an embodiment of the present invention.

FIG. 4 is a perspective view of the pouch curl prevention apparatus according to the embodiment of the present invention.

FIG. 5 is a front view and a partial enlarged view of the pouch curl prevention apparatus according to the embodiment of the present invention.

FIG. 6 is a side view and a partial enlarged view of the pouch curl prevention apparatus according to the embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Hereinafter, a pouch curl prevention apparatus according to the present invention will be described in detail with reference to the accompanying drawings.

FIG. 3 is a process view showing a pouch film forming process using a pouch curl prevention apparatus according to an embodiment of the present invention. In FIG. 3, (c) is a process plan view, and (d) is a process side view.

Referring to FIG. 3, the pouch curl prevention apparatus according to the present invention is located so as to be used after a step of forming a pouch film to form a cup portion in a pouch film forming process, and specifically is located at the rear of a pouch film forming apparatus 10 in a transfer direction of the pouch film 30.

In the present invention, the pouch film 30 may be a laminate sheet having a structure in which insulative layers each made of a polymer material are joined to opposite surfaces of a metal layer. Each of the insulative layers may have a thickness of approximately 30 μm to 40 μm, and may be coated or laminated on the metal layer. An upper one of the insulative layers is a polymer film layer that is thermally fusible, and a lower one of the insulative layers is a polymer film layer that functions as an outer protective layer. Meanwhile, the metal layer may be made of any one selected from among an alloy of iron, carbon, chromium, and manganese, an alloy of iron, chromium, and nickel, aluminum, or an equivalent thereto, and aluminum metal foil is widely used.

The pouch film forming apparatus 10 may include a die 13 configured to allow the pouch film 30 to be disposed thereon, a stripper 12 configured to press the pouch film 30 disposed on the die 13 in order to fix the pouch film 30, and a punch 11 configured to press the pouch film 30 disposed on the die 13 in order to shape an electrode assembly receiving portion. In addition, the pouch film forming apparatus may include a working table (not shown) configured to support the above-described components and to transfer the pouch film 30 to a subsequent process.

As shown in FIG. 3, the die 13 is configured to allow the pouch film 30 to be disposed thereon, and a die holder (not shown) configured to fix the die 13, on which the pouch film 30 is disposed, may be included. Here, the die 13 has a smaller area than the die holder (not shown), and is provided in an upper surface thereof with a shaping portion (not shown) configured to shape a cup portion that receives an electrode assembly in the pouch film 30.

The stripper 12, which is configured to fix the pouch film disposed on the die 13, may be provided above the die 13 so as to be movable upwards and downwards, and may press the pouch film 30 disposed on the die 13 so as to be fixed when being moved downwards. The stripper 12 may have a size corresponding to the size of the upper surface of the die 13, and may be provided in an upper surface thereof with a through-hole (not shown) having the same size as the shaping portion (not shown) provided in the die 13.

The punch 11 is provided above the die 13 so as to be movable upwards and downwards, and is inserted into the shaping portion to shape an electrode assembly receiving portion in the pouch film 30 when being moved downwards. A driving unit (not shown) configured to move the punch 11 in an upward-downward direction is included. The punch 11 is moved downwards by the driving unit, passes through the through-hole of the stripper 12, and is inserted into the shaping portion. At this time, the punch is inserted into the shaping portion in the state in which the pouch film 30 located in the shaping portion is pressed, whereby it is possible to shape an electrode assembly receiving portion having a shape corresponding to the shape of the shaping portion in the pouch film 30. After shaping of the receiving portion, the die 13 and the stripper 12 are moved upwards, the pouch film 30 having the cup portion configured to receive the electrode assembly formed therein is transferred rearwards by a pouch film transfer member (not shown), and curls formed at a pouch edge are alleviated or removed by the pouch curl prevention apparatus located at the rear. The pouch edge may be a part of the pouch film 30 in which the cup portion configured to receive the electrode assembly is not formed, specifically a non-forming part of the pouch film 30 from opposite peripheries of the pouch film to a periphery of the cup portion located parallel to the peripheries of the pouch film.

In the present invention, the pouch curl prevention apparatus is located at the rear of the pouch film forming apparatus 10 in the transfer direction of the pouch film 30.

Referring to FIG. 3, the pouch curl prevention apparatus includes a pair of upper rollers 131 and a pair of lower rollers 231 located spaced apart from each other by a predetermined distance in a lateral direction (y-axis direction) of the pouch film 30.

The punch 11 and the shaping portion (not shown) of the die 13 of the pouch film forming apparatus 10 are located between the two upper rollers 131 and between the two lower rollers 231 in the lateral direction (y-axis direction) of the pouch film 30. In addition, the pair of upper rollers 131 and the pair of lower rollers 231 are located at the edge of the cup portion configured to receive the electrode assembly formed by the pouch film forming apparatus 10 in the lateral direction (y-axis direction) of the pouch film 30.

FIG. 4 is a perspective view of the pouch curl prevention apparatus according to the embodiment of the present invention, FIG. 5 is a front view and a partial enlarged view of the pouch curl prevention apparatus according to the embodiment of the present invention, and FIG. 6 is a side view and a partial enlarged view of the pouch curl prevention apparatus according to the embodiment of the present invention.

The pouch curl prevention apparatus according to the present invention will be described with reference to FIGS. 4 to 6.

The pouch curl prevention apparatus according to the present invention receives the pouch film having the cup portion configured to receive the electrode assembly formed therein from the pouch film forming apparatus 10, rolls opposite surfaces of the pouch films at the edge of the cup portion using rollers to apply stress to curls formed at the pouch film in the pouch film forming process in an opposite direction, thereby alleviating or removing the curls. Here, a driving unit configured to transfer the pouch film may be provided. In addition, a driving unit configured to individually drive each unit component of the pouch curl prevention apparatus may be separately provided.

The pouch curl prevention apparatus may include an upper roller assembly 100 and a lower roller assembly 200.

First, the lower roller assembly 200 will be described.

The lower roller assembly 200 includes a lower frame 201 coupled and fixed to the working table (not shown) of the pouch film forming apparatus 10. The lower frame 201 may include a vertical lower frame portion (not shown) coupled to the working table (not shown) of the pouch film forming apparatus 10 and a horizontal lower frame portion (not shown) located parallel to a wide surface of the pouch film 30 that passes through an upper end of the lower frame 201.

Specifically, the horizontal lower frame portion (not shown) may be disposed perpendicular to the transfer direction (x-axis direction) of the pouch film 30. A lower roller unit 230 may be located at the lower frame 201 in a state of being fixed thereto. Specifically, a pair of lower roller fixing portions 233 may be located in a direction toward an upper part of the horizontal lower frame portion so as to be spaced apart from each other by a predetermined distance, and a lower roller shaft 232 may be located at the lower roller fixing portions 233 to fix a lower roller 231 to the lower roller fixing portions 233.

The lower roller 231 may be formed in the shape of a cylinder and may have a through-hole formed in a direction toward a central axis of the cylinder such that the lower roller shaft 232 extends through the through-hole. The lower roller 231 is rotatable about the lower roller shaft 232. The rotational direction of the lower roller 231 may be identical to or opposite the transfer direction of the pouch film 30. In addition, a central axis of the lower roller 231 may be located parallel to the lateral direction (y-axis direction) of the pouch film 30.

The pouch edge of the pouch film 30 supplied from the pouch film forming apparatus 10 is transferred rearwards in face-to-face contact with an outer circumferential surface of the lower roller 231. Here, the material for the lower roller 231 is not particularly restricted as long as the lower roller is capable of applying stress to the pouch film 30 that faces the lower roller. Specifically, the lower roller may be made of an elastic material, more specifically a rigid elastic material.

Here, each of the lower roller fixing portions 233 is provided with an up and down position adjustment member configured to adjust the up and down position of the lower roller shaft 232 in a vertical direction (z-axis direction). As a result, the deformation angle of the pouch edge of the pouch film 30 that is horizontally transferred when passing through an upper end of an outer circumferential surface of the lower roller 231 may be changed. Consequently, reverse curls are differently formed depending on the extent of pouch curls formed during forming of the pouch film 30 at the front end, which is advantageous to alleviation or removal of the pouch curls.

Next, the upper roller assembly 100 will be described.

The upper roller assembly 100 may be located above the lower roller assembly 200. The upper roller assembly 100 may include an upper frame 101, wherein the upper frame 101 may include a horizontal upper frame portion (not shown) located parallel to the horizontal lower frame portion and a vertical upper frame portion (not shown). The vertical upper frame portion is coupled to an upper part of the horizontal lower frame portion.

A vertical support portion 110 and a horizontal support portion 120 coupled and connected to the vertical support portion 110 may be located in a direction toward a lower end of the horizontal upper frame portion. The vertical support portion 110 may be formed in an upward and downward movable structure, and may adjust the up and down position of the horizontal support portion 120 connected thereto.

The upper roller assembly 100 may include a position change portion 300. The position change portion 300 may be located at each of opposite ends of the horizontal support portion 120. The position change portion 300 may be formed in a plate shape. Specifically, a through-hole (not shown) having a blocked arc shape may be formed in a central part of the position change portion such that an upper roller shaft 132, a description of which will follow, extends through the through-hole. Here, a recessed portion 310 may be formed in a lower end of the through-hole, and the upper roller shaft 132 may be mounted in the recessed portion 310. A plurality of recessed portions 310 may be formed spaced apart from the center of the through-hole (not shown) having the blocked arc shape by a predetermined angle. The predetermined angle may be 30° or less, specifically 15° or less. In addition, the recessed portions 310 may be in symmetry with respect to a central axis of the arc-shaped through-hole in a vertical direction.

An upper roller unit 130 may be mounted in the through-holes of the pair of position change portions 300. The upper roller unit 130 includes an upper roller shaft 132 mounted in the pair of position change portions 300 and a pair of upper rollers 131, through which the upper roller shaft 132 extends, the pair of upper rollers being located so as to correspond to the pair of lower rollers 231. A predetermined distance is defined between an outer circumferential surface of the lower roller 231 and an outer circumferential surface of the upper roller 131 that face each other, and the pouch edge of the pouch formed by the pouch film forming apparatus 10 may pass between the outer circumferential surfaces. In the same manner, the material for the upper roller 131 is not particularly restricted as long as the upper roller is capable of applying stress to the pouch film 30 that faces the upper roller. Specifically, the upper roller may be made of an elastic material, more specifically a rigid elastic material.

Here, the upper roller 131 and the lower roller 231 may be rotated in the transfer direction of the pouch film 30 or a direction opposite thereto, and a separate driving portion and controller configured to rotate the upper roller 131 and the lower roller 231 at a predetermined speed may be provided.

The horizontal position of the upper roller 131 or the lower roller 231 may be changed. This is advantageous to adjustment of the area of the pouch edge that passes between the upper roller 131 and the lower roller 231.

Opposite ends of the upper roller shaft 132 may be mounted in the recessed portions 310 of the pair of position change portions 300. In addition, the upper roller shaft 132 may be selectively located at any one of the plurality of recessed portions 310. As described above, the position of the upper roller shaft 132 in the recessed portion 310 may be changed, whereby the distance between the upper roller 131 and the lower roller 231 that face each other may be changed, and therefore it is possible to change stress applied to the pouch edge that passes between the upper roller 131 and the lower roller 231. Consequently, stress applied to the pouch edge may be changed depending on the extent of curls formed by the pouch film forming apparatus 10, whereby it is possible to effectively alleviate or remove curls and at the same time to reduce stress applied to the pouch edge, which is advantageous to prevention of damage to the pouch edge in a subsequent process.

An upper roller shaft fixing portion 133 may be located at a side opposite the upper roller 131 in the state in which the position change portion 300 is disposed therebetween. After the position of the upper roller shaft 132 in the recessed portion 310 is changed, the fixing portion 133 fixes the upper roller shaft 132 to the position change portion 300. As a result, it is possible to prevent change in relative position of the upper roller 131 and the lower roller 231 and distance therebetween due to movement of the upper roller shaft 132 in an upward-downward direction (z-axis direction) and a leftward-rightward direction (y-axis direction). This is advantageous to prevention of damage to the pouch edge due to non-uniform stress applied to the pouch edge that passes between the upper roller 131 and the lower roller 231.

The upper roller shaft fixing portion 133 may have a screw type shaft so as to be coupled to the upper roller shaft 132.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

1: Cell assembly
2: Cup portion
3: Pouch case
3(*a*): Upper pouch film
3(*b*): Lower pouch film
10: Pouch film forming apparatus
11: Punch
12: Stripper
13: Die
30: Pouch film
100: Upper roller assembly
101: Upper frame
110: Vertical support portion
120: Horizontal support portion
130: Upper roller unit
131: Upper roller
132: Upper roller shaft
133: Upper roller shaft fixing portion
200: Lower roller assembly
201: Lower frame
230: Lower roller unit
231: Lower roller
232: Lower roller shaft
233: Lower roller fixing portion
300: Position change portion
310: Recessed portion

The invention claimed is:

1. A system comprising a pouch curl prevention apparatus located at a rear of a pouch film forming apparatus, wherein the pouch film forming apparatus comprises:
   a die configured to allow a pouch film to be disposed thereon;
   a stripper configured to press the pouch film disposed on the die; and
   a punch configured to press the pouch film disposed on the die to shape an electrode receiving portion; and
   wherein the pouch curl prevention apparatus comprises:
   an upper roller assembly comprising an upper roller unit including at least a pair of upper rollers, an upper roller shaft having a first end and a second end and extending through the pair of upper rollers, and between a pair of position change portions of the pair of upper rollers, wherein a first roller of the pair of upper rollers is mounted on the upper roller shaft adjacent to the first end and a second roller of the pair of upper rollers is mounted on the upper roller shaft adjacent to the second end, wherein the first and second ends of the upper roller shaft are selectively mounted in corresponding recessed portions of the pair of position change portions; and
   a lower roller assembly comprising a lower roller unit including at least a pair of lower rollers, wherein
   the pair of upper rollers and the pair of lower rollers are located so as to face each other,
   at least one of the pair of upper rollers and the pair of lower rollers is rotatable, and
   wherein the upper roller unit and the lower roller unit are configured to pass a pouch film supplied from the pouch film forming apparatus therebetween, and
   wherein the at least one of the pair of upper rollers and the at least one of the pair of lower rollers are located at an edge of the electrode receiving portion in a lateral direction of the pouch film.

2. The system according to claim 1, wherein the pair of upper rollers and the pair of lower rollers are located so as to face each other in a state of being spaced apart from each other by a predetermined distance, and arranged to receive a pouch edge of the pouch film supplied from the pouch film forming apparatus between the pair of upper rollers and the pair of lower rollers.

3. The system according to claim 1, wherein the pair of upper rollers are located spaced apart from each other by a predetermined distance, the pair of lower rollers are located spaced apart from each other by a predetermined distance, and the pair of upper rollers and the pair of lower rollers are located so as to face each other in a state of corresponding to each other.

4. The system according to claim 1, wherein a position of each of the recessed portions, in which the upper roller shaft is mounted, is changeable to adjust a distance between at least one of the at least a pair of upper rollers and at least one of the at least a pair of lower rollers.

5. The system according to claim 3, wherein the predetermined distance between the pair of upper rollers or the predetermined distance between the pair of lower rollers is adjustable.

6. The system according to claim 1, wherein the upper roller assembly comprises a vertical support portion configured to be movable upwards and downwards in order to adjust a height of the upper roller unit.

7. The system according to claim 1, wherein the lower roller assembly comprises a lower roller fixing portion, and the lower roller fixing portion is provided with a position adjustment member configured to adjust an up and down position of the pair of lower rollers.

8. The pouch curl prevention apparatus according to claim 2, wherein at least one of the at least a pair of upper rollers or at least one of the at least a pair of lower rollers is made of an elastic material.

* * * * *